(12) United States Patent
Karlsson

(10) Patent No.: US 8,941,603 B2
(45) Date of Patent: Jan. 27, 2015

(54) TOUCH SENSITIVE DISPLAY

(75) Inventor: David Karlsson, Lund (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 217 days.

(21) Appl. No.: 13/318,843

(22) PCT Filed: Dec. 10, 2010

(86) PCT No.: PCT/EP2010/069354
§ 371 (c)(1),
(2), (4) Date: Apr. 11, 2012

(87) PCT Pub. No.: WO2012/076062
PCT Pub. Date: Jun. 14, 2012

(65) Prior Publication Data
US 2012/0188179 A1    Jul. 26, 2012

(51) Int. Cl.
*G06F 3/041* (2006.01)
*G06F 3/01* (2006.01)

(52) U.S. Cl.
CPC .............. *G06F 3/041* (2013.01); *G06F 3/011* (2013.01); *G06F 3/016* (2013.01)
USPC .......... 345/173; 345/419; 381/114; 340/407.1

(58) Field of Classification Search
CPC . G06F 3/03547; G06F 3/0426; G06F 3/0488; G09G 5/00; G08B 6/00; G06T 15/00
USPC .............. 345/7, 156, 173, 419, 632, 633; 340/407.1, 407.2; 382/103, 114; 434/113, 114

See application file for complete search history.

(56) References Cited

U.S. PATENT DOCUMENTS

| | | | | |
|---|---|---|---|---|
| 5,235,510 A * | 8/1993 | Yamada et al. | ............... | 600/300 |
| 5,412,569 A * | 5/1995 | Corby et al. | ...................... | 701/2 |
| 5,942,970 A | 8/1999 | Norman | | |
| 7,301,547 B2 * | 11/2007 | Martins et al. | ................ | 345/633 |
| 7,324,081 B2 * | 1/2008 | Friedrich et al. | ............... | 345/156 |
| 7,401,920 B1 * | 7/2008 | Kranz et al. | .................. | 351/210 |
| 7,737,965 B2 * | 6/2010 | Alter et al. | .................... | 345/419 |
| 7,903,109 B2 * | 3/2011 | Rurin | ............................ | 345/419 |
| 8,102,334 B2 * | 1/2012 | Brown et al. | ..................... | 345/8 |
| 8,294,557 B1 * | 10/2012 | El Saddik et al. | .......... | 340/407.1 |
| 8,301,159 B2 * | 10/2012 | Hamynen et al. | .......... | 455/456.1 |
| 8,314,815 B2 * | 11/2012 | Navab et al. | .................. | 345/633 |

(Continued)

FOREIGN PATENT DOCUMENTS

WO    2009/097866    8/2009

OTHER PUBLICATIONS

International Search Report and Written Opinion dated May 23, 2011 issued in corresponding PCT application No. PCT/EP2010/069354, 13 pages.

*Primary Examiner* — Joe H Cheng
(74) *Attorney, Agent, or Firm* — Snyder, Clark, Lesch & Chung LLP

(57) ABSTRACT

The present solution relates to a device (800) comprising a touch sensitive display (111). The device (800) further comprises a receiving unit (701) configured to receive image data. The device (800) further comprises a processing unit (703) configured to display the image data as a haptic image on the touch sensitive display (111), whereby objects comprised in the haptic image are discernable to a user by sense of touch.

13 Claims, 8 Drawing Sheets

(56) References Cited

U.S. PATENT DOCUMENTS

| | | | |
|---|---|---|---|
| 2003/0210228 A1* | 11/2003 | Ebersole et al. | 345/157 |
| 2004/0136571 A1* | 7/2004 | Hewitson et al. | 382/114 |
| 2005/0057528 A1 | 3/2005 | Kleen | |
| 2005/0174470 A1* | 8/2005 | Yamasaki | 348/345 |
| 2006/0089786 A1* | 4/2006 | Soehren | 701/200 |
| 2009/0102859 A1 | 4/2009 | Athsani et al. | |
| 2009/0251421 A1 | 10/2009 | Bloebaum | |
| 2009/0322671 A1 | 12/2009 | Scott et al. | |
| 2011/0205242 A1* | 8/2011 | Friesen | 345/633 |
| 2011/0210931 A1* | 9/2011 | Shai | 345/173 |
| 2011/0213664 A1* | 9/2011 | Osterhout et al. | 705/14.58 |
| 2012/0068913 A1* | 3/2012 | Bar-Zeev et al. | 345/8 |
| 2012/0075343 A1* | 3/2012 | Chen et al. | 345/633 |
| 2012/0326948 A1* | 12/2012 | Crocco et al. | 345/7 |

* cited by examiner

TOUCH SENSITIVE DISPLAY

RELATED APPLICATIONS

This application is a National Stage application of, and claims priority to, PCT Application PCT/EP2010/069354, filed on Dec. 10, 2010.

TECHNICAL FIELD

This invention relates to a device comprising a touch sensitive display, a communication device comprising the device, and a communication system comprising the communication device.

BACKGROUND

Augmented reality (AR) is a term for a live direct or indirect view of a physical real-world environment whose elements are augmented by virtual computer-generated sensory input such as sound or graphics.

Augmented Reality is becoming an intricate part of our everyday life. Today many augmented reality applications exist which just display the scene that the camera of a device captures, with computer generated layers superimposed. The device may be for example AR glasses. When a user uses one of these applications, he needs to hold the device half a meter from his face, with a straight arm. This is inconvenient, so the breakthrough for AR will probably not come until it is possible to buy regular sized glasses that augment an image.

AR glasses do however come with an input problem. In today's augmented reality applications handling input is easy since the user is looking at a touch display; he can just touch the display to interact with it. When interacting with a displayed image when wearing a pair of AR glasses there are a few of options.
  1. Voice commands. The user may ask his device about what he is seeing: e.g. "What is the species of that tree that I am looking at?".
  2. Video capture of gestures, e.g. the user points at the object he wants to interact with and the video of his gesture is analysed to determine his intention.
  3. Eye tracking, e.g. the user stares at the object he wants to interact with.

The problems with (2) and (3) is that they are usually socially unacceptable, a user may feel uncomfortable gesturing wildly or staring intensely at an object of interest.

The problem with (1) is that voice recognition is tricky; to be able to do speech recognition with any type of acceptable accuracy it is necessary to have a context in which to interpret the speech. E.g. when ordering tickets with an automated ticketing system, e.g. by telephone, there is a known context. The system knows what the potential destinations are; hence it may reduce the search space when interpreting the speech. Even so, as anyone who has used one of these telephony systems knows, they are far from perfect, and it causes a lot of frustration.

The problem with using speech recognition for AR is that there is no particular context, as in the case with the ticketing system. The context is everything that is visible to the naked eye, which will make it very difficult to use for AR purposes.

SUMMARY

The objective problem is therefore to obviate at least one of the above disadvantages and to provide an improved touch sensitive display.

According to a first aspect of the invention, the objective problem is solved by a device comprising a two or three dimensional touch sensitive display of any shape or size. The device comprises a receiving unit configured to receive image data that has been captured or that is being captured, directly or indirectly from an image capturing device or from memory means, such as for example a USB memory. The device also comprises a processing unit configured to display the image data as a haptic image on the touch sensitive display i.e. the processing unit is configured to analyze the received image data and present it on the touch sensitive display in a manner in which objects in the image are projected above or below the plane of the touch sensitive display whereby a user can detect objects in the displayed image by sense of touch.

It should be noted that a receiving unit and a processing unit need not necessarily be two separate units. A single unit, such as a processor, may for example be configured to receive, process and display image data.

According to a second aspect of the invention, the objective problem is solved by a communication device comprising a device as described above. The communication device constitutes a mobile telephone, media player, tablet device, Personal Communications System (PCS) terminal, Personal Data Assistant (PDA), laptop computer, palmtop receiver, camera, television, radar or any appliance that includes a transducer designed to transmit and/or receive radio, television, telephone and/or radar signals.

According to a third aspect of the invention, the objective problem is solved by a communication system which comprises a communication device as described above, and an image capturing device configured to capture an image and to transmit the image to the communication device.

The present technology affords many advantages, for which a non-exhaustive list of examples follows:

An advantage with the present solution is that it makes it possible to interact with AR applications with high precision, in a natural way, without having the undesirable properties of voice- and gesture commands. Furthermore, it comes with a very compelling proposition that gives users a new way of interacting with everyday objects by translating visual input into something touchable, which is a new way of experiencing the world. We know what the Eifel tower looks like, but how does it feel to distinguish the shape of the Eifel tower?

The present solution is not limited to the features and advantages mentioned above. A person skilled in the art will recognize additional features and advantages upon reading the following detailed description.

BRIEF DESCRIPTION OF THE DRAWINGS

The solution will now be further described in more detail in the following detailed description by reference to the appended drawings illustrating embodiments of the solution and in which.

The drawings are not necessarily to scale, emphasize is instead being placed upon illustrating the principle of the solution.

DETAILED DESCRIPTION

This present solution presents an approach for handling input to a communication system, such as an AR system, which is both precise and does not have the undesirable properties of voice- and gesture commands.

If a user's virtual touch gesture on a haptic touch sensitive display or screen may somehow cause a visible movement of real life objects, the movement of the objects would cause feedback automatically in the AR system. One may imagine that the haptic touch sensitive display is configured to detect whether objects in the image are being touched virtually, and responding physically to the virtual touch.

Figure 1:
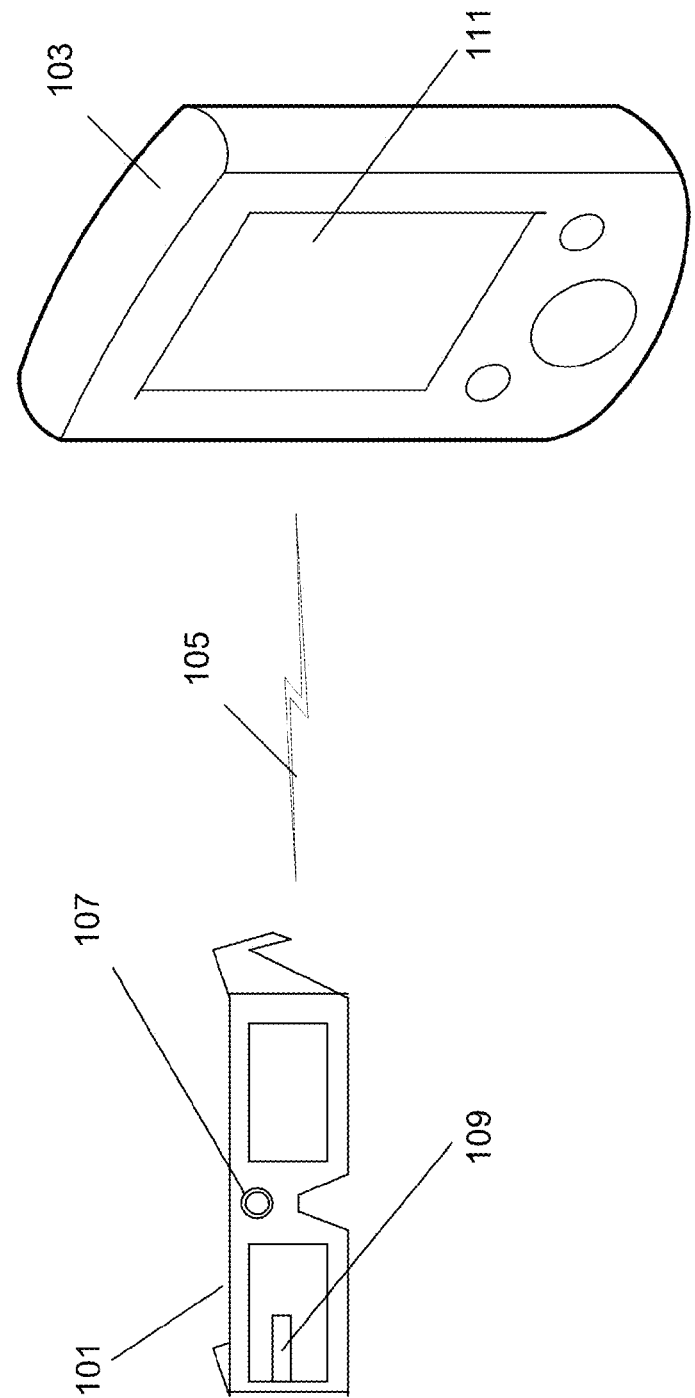
FIG. 1 is a schematic drawing illustrating embodiments of a communication system.

A communications system 100, e.g. an augmented reality system, is illustrated in FIG. 1. The system 100 comprises e.g. a pair of AR glasses 101 together with a communication device 103. The AR glasses 101 may be configured to be worn on the head of a user. The AR glasses 101 may be connected to or integrated into the communication device 103. In an embodiment where the communication device 103 is connected to the AR glasses 101, the connection may be of any suitable kind comprising either a wired or wireless link 105. In other embodiments, the AR glasses 101 may be integrated into the communication device 103. As understood by a person skilled in the art, when the glasses 101 are integrated into the communication device 103, the shape and size of the glasses 101 are not as exemplified in FIG. 1. The glasses 101 comprise a front mounted 3D camera 107 which is directed in the same direction as the field of vision of the person wearing the glasses in the illustrated embodiment. The camera 107 is configured to capture and/or record two or three dimensional video and/or still images of a scene. The glasses 101 also comprise a display 109 which may allow the wearer to view superimposed graphics, either wile wearing the glasses 101 or when looking at the outer surface of the glasses 101.

The communication device 103 may be any suitable communication device or computational device with communication capabilities. The communication device 103 may for instance be, but is not limited to, a mobile phone, smart phone, tablet device, media player, personal digital assistant (PDA), laptop, MP3 player or portable DVD player, or similar media content devices, TV, digital camera, or even stationary devices such as a PC, radar or any appliance that is configured to transmit and/or receive radio, television, telephone and/or radar signals, digital or analog.

A haptic touch sensitive display 111, or touch sensitive display, is an electronic visual 2D or 3D display that may detect the presence and location of a touch within the display area. The display area provides two or three dimensional images. The images are discernable to a user by sense of touch. A user may touch the touch sensitive display 111, i.e. the image, with a finger, a hand or another passive object, such as a stylus. Objects in images shown on the touch sensitive display 111 are projected above or below the plane of the touch sensitive display 111 whereby a user can detect objects in the displayed image by sense of touch.

The touch sensitive display 111 enables a user to interact directly with what is displayed, rather than indirectly with a cursor controlled by a mouse or touchpad. The haptic touch sensitive display 111 may use technologies such as e.g. Electro Active Polymers (EAP), or any suitable material which may exhibit a change in its size or shape when stimulated by an electric filed. The touch sensitive display 111 may be of any suitable size and shape. A haptic touch sensitive display 111 may be comprised in the communication device 103.

A haptic touch sensitive display 111 may render a scene in two or three dimensions in the sense that it may render the contours and textures of objects in the scene so that it is possible for the user, by using his hands, to feel and recognize the objects that he is looking at through the AR glasses 101. The connection link between the AR glasses 101 and the touch sensitive device 111 may be any suitable kind comprising either a wired or wireless link.

Figure 2:
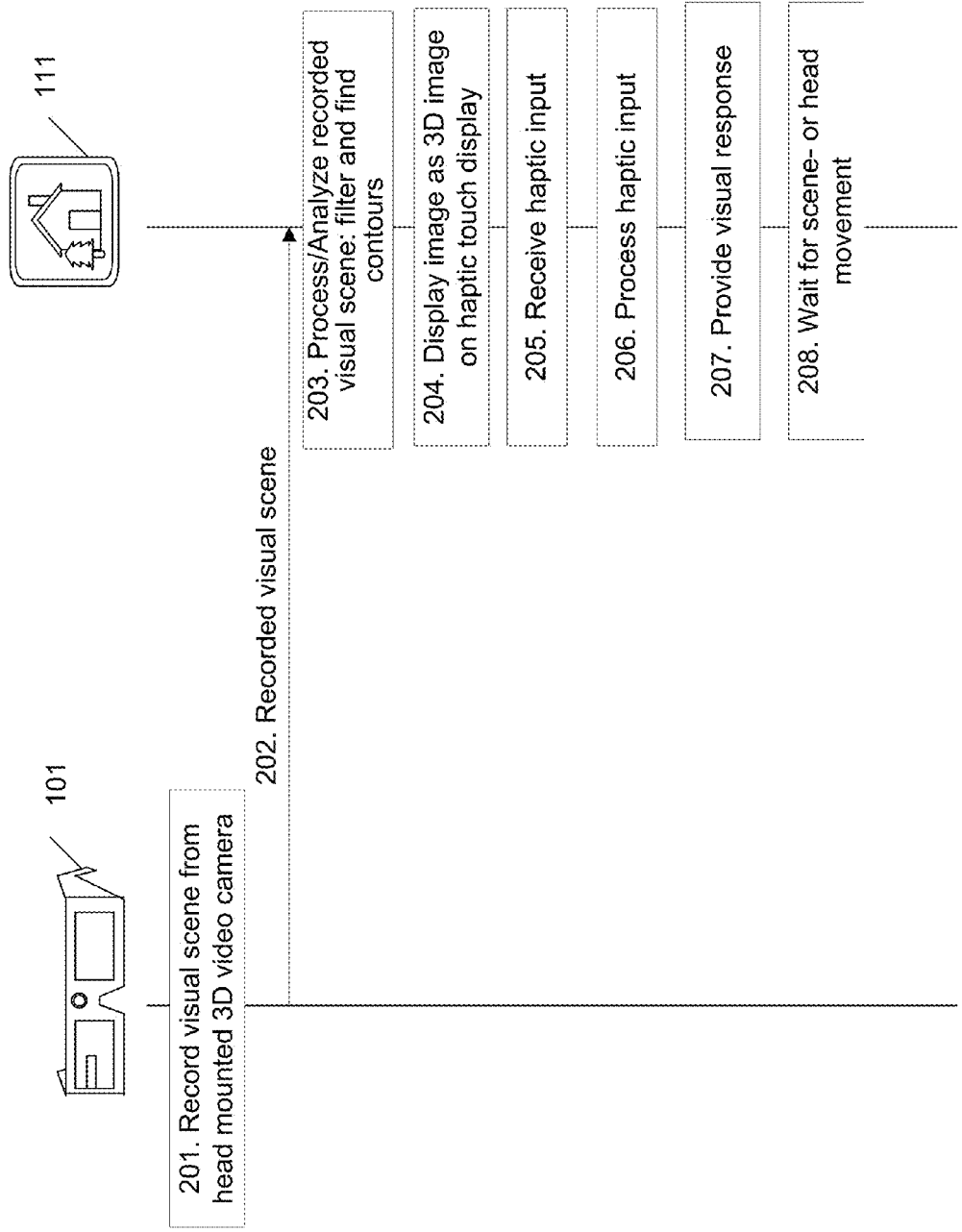
FIG. 2 is a combined signaling diagram and flowchart depicting embodiments of a method.
Figure 3:
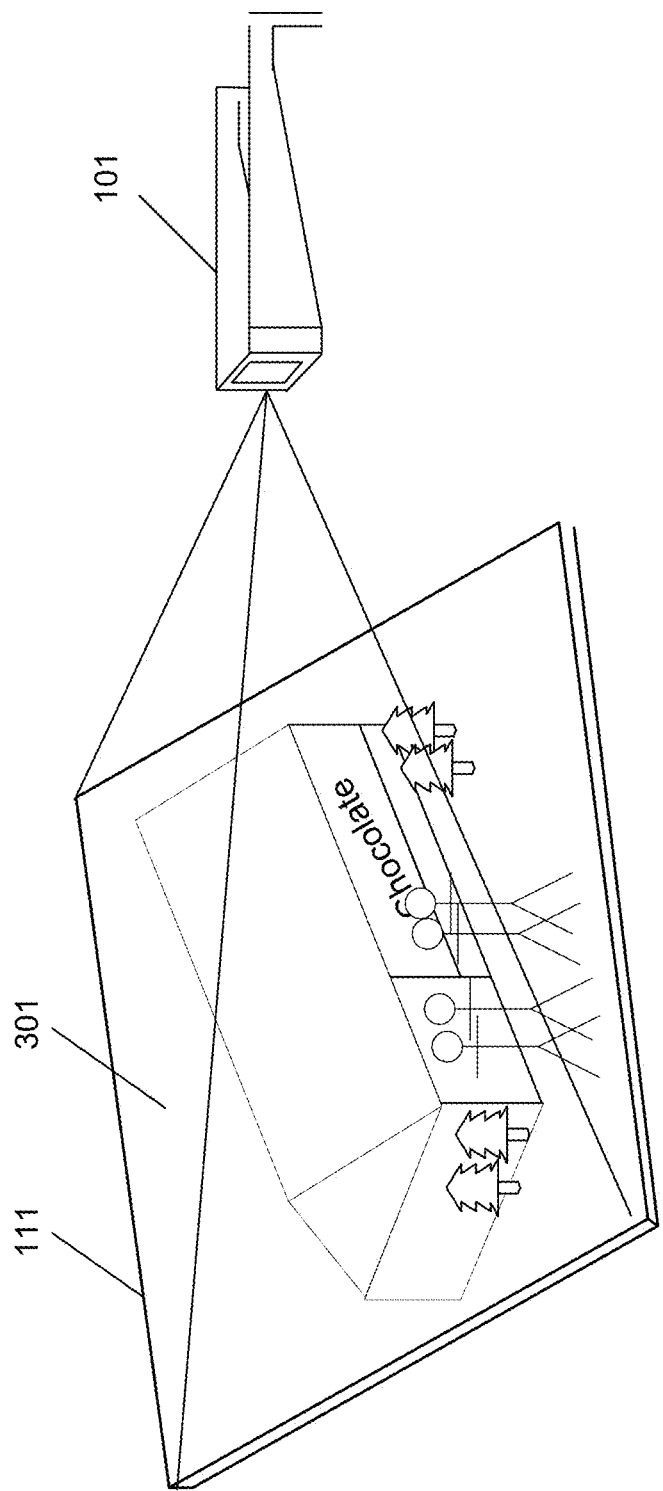
FIG. 3 is a schematic drawing illustrating embodiments of a scene recorded by a camera.
Figure 4:
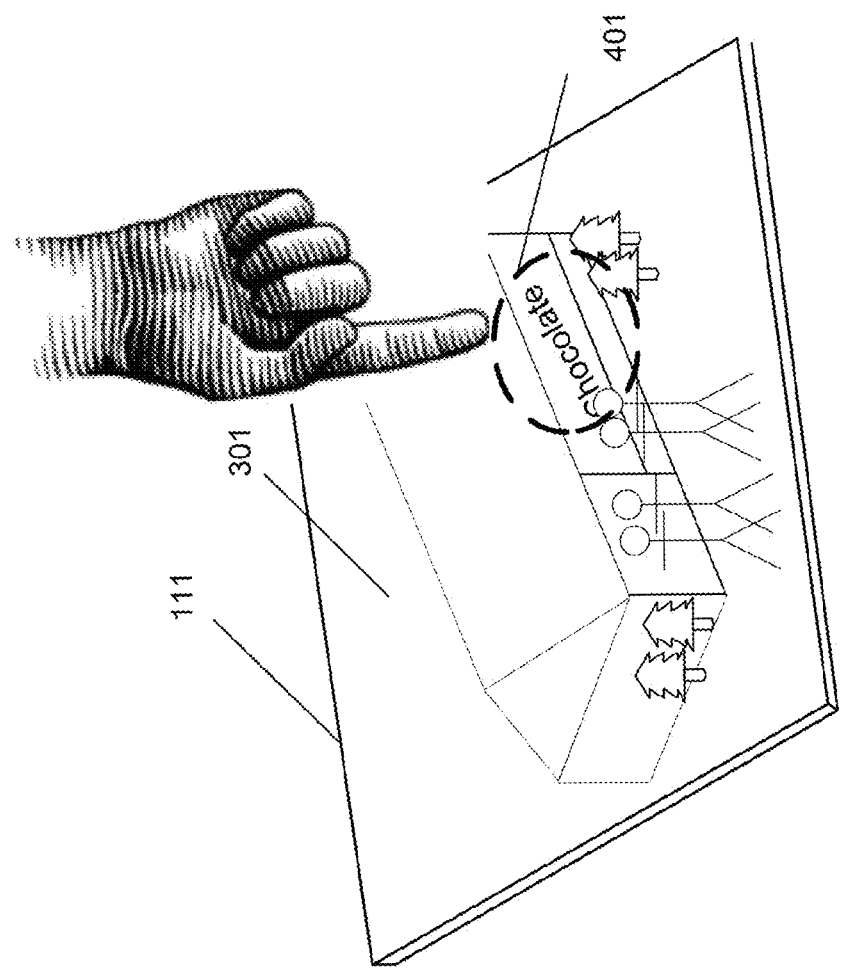
FIG. 4 is a schematic drawing illustrating embodiments of a haptic touch display.
Figure 4:
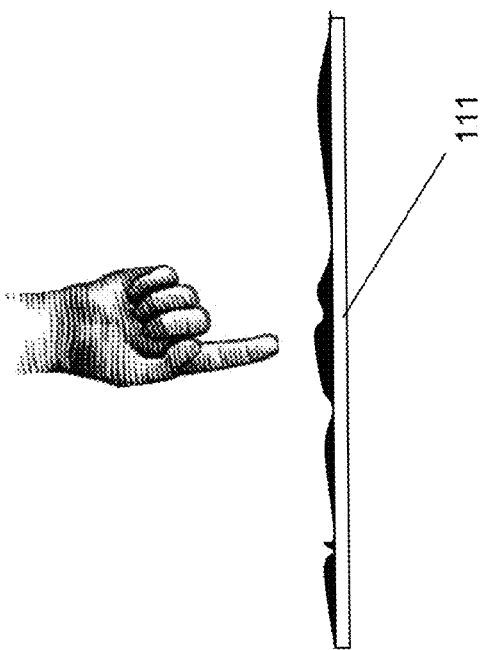
Figure 5:
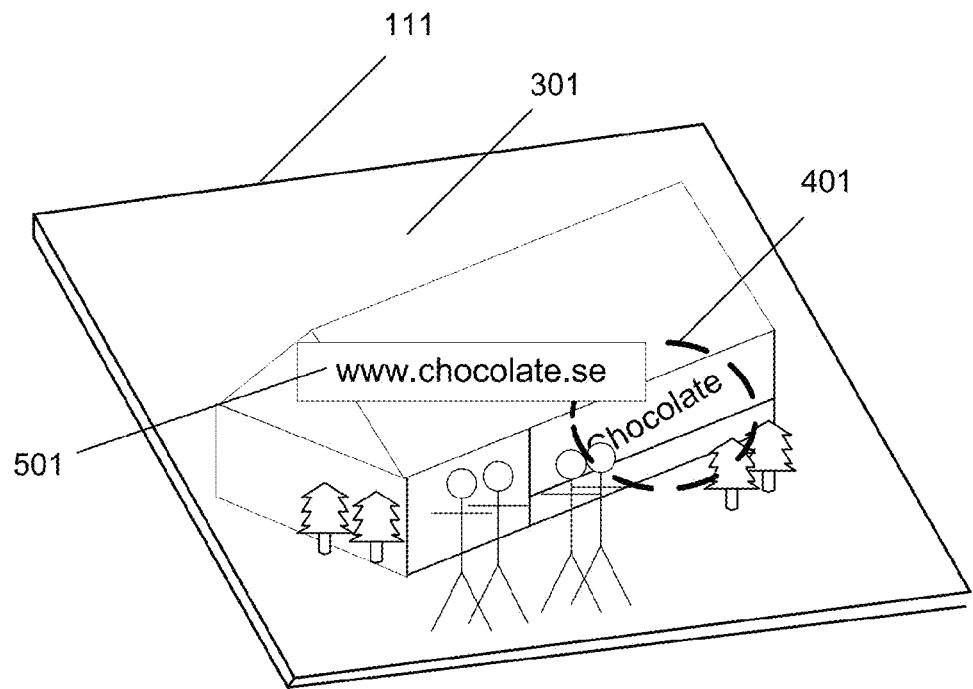
FIG. 5 is a schematic drawing illustrating embodiments of visual response in a communication system.
Figure 6:
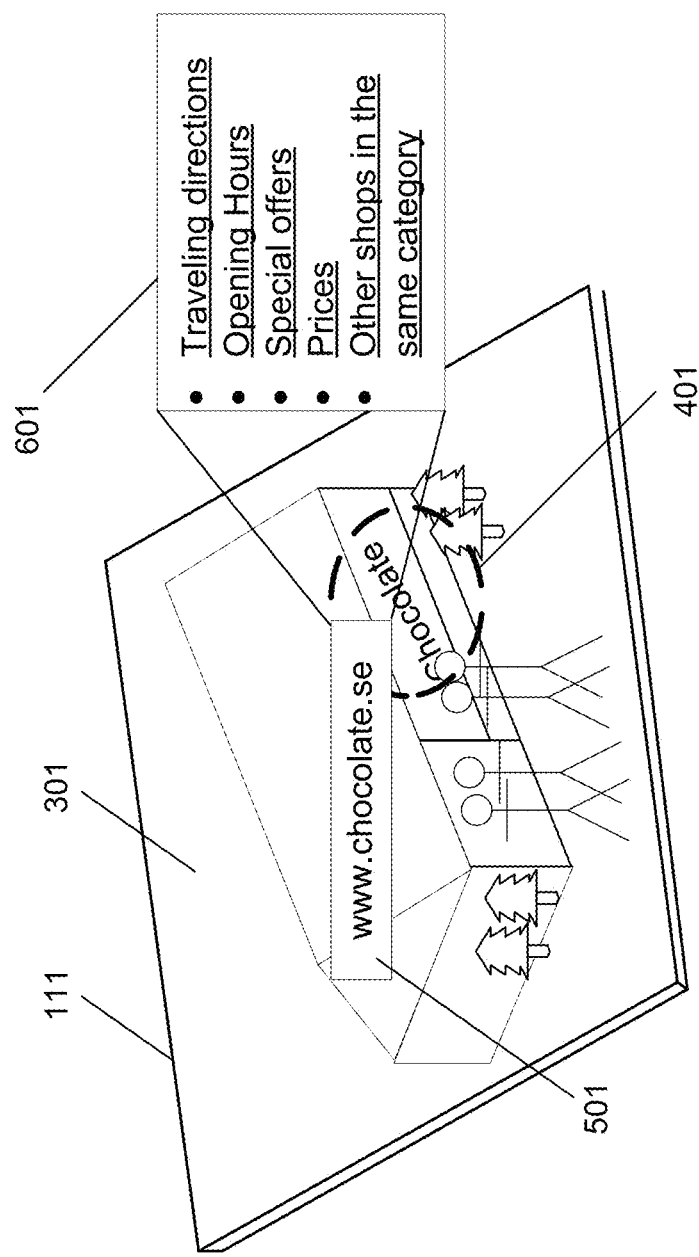
FIG. 6 is a schematic drawing illustrating embodiments of visual response in a communication system.

The present solution method for providing haptic feedback to a user using the haptic touch sensitive display 111, according to some embodiments will now be described with reference to the combined signaling diagram and flowchart depicted in FIG. 2 and with reference to FIG. 1 depicting the communication system 100, FIG. 3 depicting a recorded scene, FIG. 4 depicting a superimposed marker, FIG. 5 depicting a visual response and FIG. 6 depicting a selection list. AR glasses 101 are used as an exemplary device in this description, however any suitable device equipped with AR technology can be used. The method comprises the following steps, which steps may as well be carried out in any suitable order.

Step 201

The AR glasses 101 record/capture a visual scene 301. The AR glasses 101 may capture the scene by using the camera 107, as illustrated in FIG. 3. The visual scene 301 may be captured as video and/or still image(s) and is the scene 301 as seen by the user wearing the glasses 101. As shown in FIG. 3, the scene 301 may for example be a street with the shop Chocolate.

In some embodiments, the visual scene 301 is captured or has been captured, directly or indirectly, from some other means, e.g. any device equipped with AR technology, or from memory means, such as for example a USB memory.

The visual scene 301 is captured directly or indirectly, depending on if the scene is captured by e.g. AR glasses 101 being external to the touch sensitive display 111, or if the scene is captured by the touch sensitive display 111 itself.

Step 202

The AR glasses 101 transmit the recorded visual scene 301, i.e. image data, to the touch sensitive display 111. The transmission may be in real time, i.e. performed continually as the user sees the scene 301, on demand, or periodically. In some embodiments, the transmission is performed via a wired or wireless connection.

The touch sensitive display 111 may comprise a receiver (not shown) configured to receive the recorded visual scene 301 from the AR glasses 101.

The captured scene 301 may be simplified by passing it through a filtering mechanism before it is transmitted to the touch sensitive display 111 which renders the scene 301 as an image. The filtering mechanism may remove the parts and/or details of the captured scene 301 that is unnecessary for rendering the contours and textures of objects in the scene 301.

Step 203

A processing unit (not shown) comprised in the touch sensitive display 111 processes and/or analyzes the recorded visual scene 301. When processing, the processor may perform filtering of the recorded visual scene 301 to find the contours of the captured scene. The filtering performed in the processing unit may be in addition to or instead of the filtering mechanism in the AR glasses 101.

In some embodiments, if the touch sensitive display 111 comprises a receiver, the receiver is also configured to provide the recorded visual scene 301 to the processing unit.

Step 204

The captured scene 301 is rendered as a 2D or 3D image on the haptic touch sensitive display 111 in the sense that it renders the contours and textures of objects in the scene 301 so that it is possible for the user, by using his hands, to feel and recognize the objects that he is or has been looking at through the AR glasses 101, or which he has captured using the AR glasses 101 or via some other means. In other words, the captured scene 301 is displayed as a haptic image on the touch sensitive display 111. Objects in the haptic image are discernable to a user by sense of touch.

The captured scene 301 is displayed as a haptic image on the touch sensitive display 111 continuously, periodically, on demand or when a user touches the touch sensitive display 111.

Step 205

The touch sensitive display 111 receives haptic input from the user, i.e. the touch sensitive display 111 receives input data. The haptic input may be that the user touches or taps an object shown on the touch sensitive display 111.

When the user touches the haptic touch sensitive display 111, it records the gesture, and may 0display a superimposed marker 401, as illustrated as a dotted circle in FIG. 4, as a layer in the display 109 of the AR glasses 101 or on the touch sensitive display 111. While looking at the real life objects a user may use the haptic touch sensitive display 111 to touch the virtual representation of the real life objects, giving him the ability to touch and feel what he is seeing, or what he has recorded. Using the example of the scene shown in FIG. 4, a user may touch the shop Chocolate shown on the touch sensitive display 111.

Step 206

When a user has touched or recorded an object, e.g. the shop Chocolate, on the touch sensitive display 111, the processor processes the haptic input, i.e. it executes an action(s) which corresponds to or is associated with the tapped object. For example, the processor may retrieve the geographical position of the shop Chocolate. The processor may perform the processing with assistance from e.g. a positioning or navigation unit.

Step 207

A visual response 501 based on the haptic input may be provided on the touch sensitive display 111, as illustrated in FIG. 5, or in the display of the AR glasses 101. The location of the touch gesture may be shown with superimposed layer in the AR Glasses 101 or on the touch sensitive display 111, or both in the glasses 101 and the touch sensitive display 111. The AR glasses 101 may be configured to overlay desired information of the user of the glasses 101 over the image on the touch sensitive display 111 while wearing the AR glasses 101. For example, the web address of the shop Chocolate is provided as visual response 501 to the user's touch of the shop on the touch sensitive display 111. It gives the user a visual response or feedback of his touch actions.

This mimics the real life experience of touching an object with hands. The user may see in the display 109 of the glasses 101 or on the touch sensitive display 111 what his hands are touching on the touch sensitive display 111, which reinforces the experience of touch. For example, as illustrated in FIG. 5, when the user has touched the sign of the shop "Chocolate" on the touch sensitive display 111, the visual response 501 comprising the e.g. web page address of "Chocolate", appears on the display 109 of the AR glasses 101 or on the touch sensitive display 111.

To be able to provide a visual response 501 to a touch action, the touch sensitive display 111 may, in some embodiments, comprise a positioning or navigation unit (not shown) which is configured to obtain a geographical position of the user, i.e. the position of the AR glasses 101. The positioning unit may use a satellite based positioning system, such as e.g. the Global Positioning System (GPS) or Galileo, or the positioning unit may use e.g. wifi positioning etc. The positioning unit may transmit the graphical position of the AR glasses 101 to the processing unit. The processing unit may be pre-configured with the size of coverage area of the camera 107, i.e. the size of the scene 301 seen by the user wearing the AR glasses 101. The processor is configured to map the image shown on the touch sensitive display 111 with the geographical position. Thus, when the user touches an object on the touch sensitive display 111, e.g. the sign of the shop Chocolate illustrated in FIG. 5, the processing unit may determine the position of the touched object, i.e. the position of Chocolate. By knowing the geographical position of the touched object, e.g. the position of the shop Chocolate, the processing unit may derive further information about the touched object, by e.g. looking up the geographical position in a phone book, by making a search on the internet for the geographical position etc.

The visual response may, in some embodiments, provide further information associated with the haptic input, e.g. a selection list providing further information or links to further information. When a user has selected an object on the image on the touch sensitive display 111, he may be provided with a selection list of different information available for the object. The different items in the selection list may be direct information about the object, or they may be links to further information about the object. For example, when the user has selected the shop Chocolate, he may be given the opportunity to touch/select the visual response 501. When selecting or touching the visual response 501 the user may get a selection list 601 as exemplified in FIG. 6. The selection list 601 may comprise links to travel directions to the shop, opening hours, prices, other shops in the same category, etc. By selecting one of the links, the user is provided with the selected info either on the touch sensitive display 111, superimposed on the image shown on the touch sensitive display 111, or in the display 109 of the AR glasses 101.

Returning back to FIG. 2.

Step 208

The Augmented Reality system 100 waits for a new scene captured by the camera 107, i.e. the user moves his head or new data is supplied to the AR system 100, and the method starts again from step 201.

Figure 7:
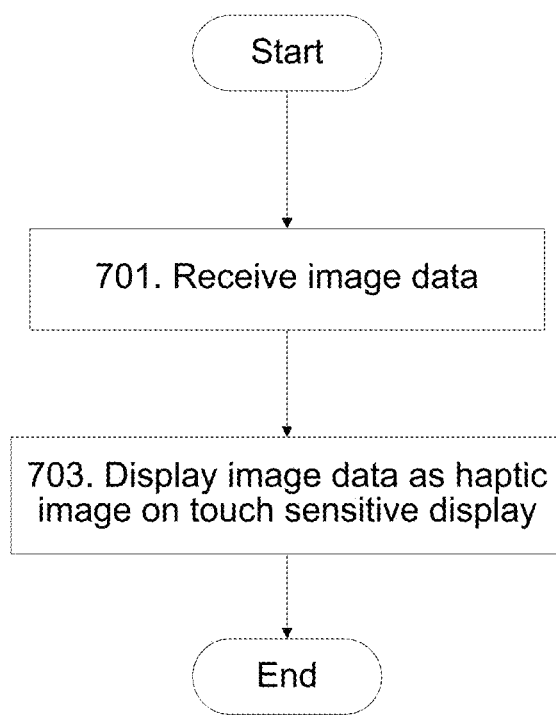
FIG. 7 is a flowchart depicting embodiments of a method.

The method described above will now be described seen from the perspective of a device 800. FIG. 7 is a flowchart describing the present method in the device 800. The device 800 comprises a touch sensitive display 111. In some embodiments, the touch sensitive display 111 is a two or three dimensional haptic touch sensitive display 111. In some embodiments, the touch sensitive display 111 comprises material that exhibits a change in its size or shape when stimulated by an electric field. The method comprises the steps to be performed in the device 800:

Step 701

This step corresponds to steps 201 and 202 in FIG. 2. The device 800 receives image data.

In some embodiments, the image data is received from an image data capturing device 101. In some embodiments, the image data capturing device 101 comprises augmented reality glasses comprising a camera 107.

Step 703

This step corresponds to the steps 203, 204, 205, 206, 207 and 208 in FIG. 2. The device 800 displays the image data as a haptic image on the touch sensitive display 111. Objects comprised in the haptic image are discernable to a user by sense of touch.

In some embodiments, the image data is displayed as a haptic image on the touch sensitive display 111 continuously, periodically, on demand or when a user touches the touch sensitive display 111.

In some embodiments, the received image data is processed into the haptic image.

In some embodiments, input data is received from the touch sensitive display 111. The input data is associated with touched objects in the haptic image.

In some embodiments, the received input data is displayed on the touch sensitive display 111 or on a second display 109. In some embodiments, the second display 109 is comprised in the image capturing device 101.

In some embodiments, a geographical position of the touch sensitive display 111 is provided.

Figure 8:
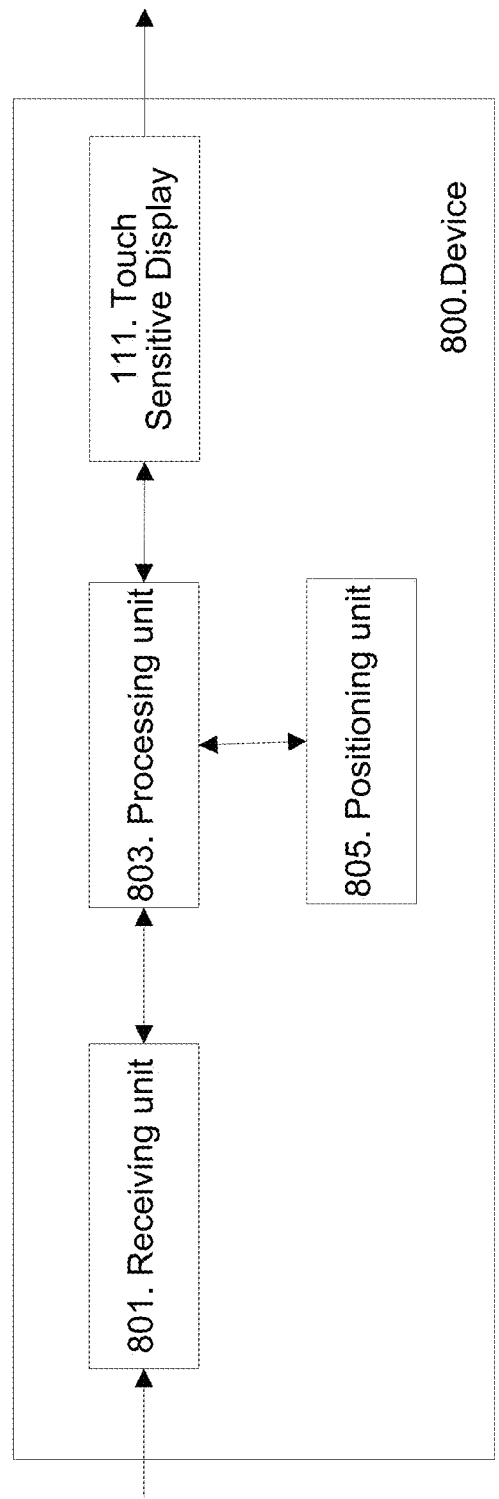
FIG. 8 is a schematic drawing illustrating embodiments of a device.

To perform the method steps shown in FIGS. 2 and 7 a device 800 as shown in FIG. 8 is provided. The device 800 comprises a touch sensitive display 111. In some embodiments, the touch sensitive display 111 is a two or three dimensional haptic touch sensitive display. In some embodiments, the touch sensitive display 111 comprises material that exhibits a change in its size or shape when stimulated by an electric field.

The device 800 further comprises a receiving unit 801 which is configured to receive image data. In some embodiments, the receiving unit 801 is configured to receive the image data from an image data capturing device 101. In some embodiments, the image data capturing device 101 comprises augmented reality glasses comprising a camera 107. In some embodiments, the receiving unit 801 is further configured to receive input data from the touch sensitive display 111. The input data is associated with touched objects in the haptic image.

The device 800 further comprises a processing unit 803 configured to display the image data as a haptic image on the touch sensitive display 111. Objects comprised in the haptic image are discernable to a user by sense of touch. In some embodiments, the processing unit 803 is further configured to display the image data as a haptic image on the touch sensitive display 111 continuously, periodically, on demand or when a user touches the touch sensitive display 111. In some embodiments, the processing unit 803 is further configured to process the received image data into the haptic image.

In some embodiments, the processing unit 803 is further configured to display the received input data on the touch sensitive display 111 or on a second display 109. In some embodiments, the second display 109 is comprised in the image capturing device 101.

In some embodiments, the device 800 further comprises a positioning unit 805 configured to provide a geographical position of the touch sensitive display 111.

The processing unit 803 may be for example a Digital Signal Processor (DSP), Application Specific Integrated Circuit (ASIC) processor, or a Field-programmable gate array (FPGA) processor or micro processor.

It should be noted that the receiving unit 801 and the processing unit 803 need not necessarily be two separate units. A single unit, such as a processor, may for example be configured to receive, process and display image data.

The communication device 103 mentioned above comprises a device 800 as described above in relation to FIG. 8.

The communication device 103 may constitute a mobile telephone, media player, tablet device, Personal Communications System (PCS) terminal, Personal Data Assistant (PDA), laptop computer, palmtop receiver, camera, television, radar or any appliance that includes a transducer designed to transmit and/or receive radio, television, telephone and/or radar signals.

The communication system 100 mentioned above comprises a communication device 103. The communication device 103 comprises a device 800 as described above in relation to FIG. 8, and am image capturing device 101 configured to capture an image and to transmit the image to the communication device 103.

The present solution is not limited to the above described preferred embodiments. Various alternatives, modifications and equivalents may be used. Therefore, the above embodiments should not be taken as limiting the scope of the solution, which is defined by the appending claims.

It should be noted that the words "a" or "an" preceding an element do not exclude the presence of a plurality of such elements.

It should be emphasized that the term "comprises/comprising" when used in this specification is taken to specify the presence of stated features, integers, steps or components, but does not preclude the presence or addition of one or more other features, integers, steps, components or groups thereof.

It should also be emphasized that the steps of the methods defined in the appended claims may, without departing from the present solution, be performed in another order than the order in which they appear in the claims.

The invention claimed is:

1. A device comprising a touch sensitive display, the device further comprising:
 a receiving unit configured to receive image data from augmented reality glasses in real time, on demand or periodically; and
 a processing unit configured to display the image data as a haptic image on the touch sensitive display, whereby objects comprised in the haptic image are discernable to a user by sense of touch; wherein
 the receiving unit is further configured to receive input data from the touch sensitive display, whereby the input data is associated with touched objects in the displayed haptic image; and wherein
 the processing unit is further configured to display a marker associated with the received input data on the touch sensitive display or on a second display, wherein the marker is superimposed on the haptic image.

2. The device according to claim 1, wherein the processing unit is configured to display the image data as a haptic image on the touch sensitive display continuously, periodically, on demand or when a user touches the touch sensitive display.

3. The device according to claim 1, wherein the augmented reality glasses are comprised in an image data capturing device.

4. The device according to claim 3, wherein the image data capturing device comprises a camera.

5. The device according to claim 1, wherein the processing unit is further configured to process the received image data into the haptic image.

6. The device according to claim 1, further comprising
 a positioning unit configured to provide a geographical position of the touch sensitive display.

7. The device according to claim 1, wherein the touch sensitive display is a two or three dimensional haptic touch sensitive display rendering the haptic image in two or three dimensions.

8. The device according to claim 1, wherein the touch sensitive display comprises material that exhibits a change in its size or shape when stimulated by an electric field.

9. A communication device comprising the device of claim 1.

10. The communication device according to claim 9, wherein the communication device includes a mobile telephone, media player, tablet device, Personal Communications System terminal, Personal Data Assistant, laptop computer, palmtop receiver, camera, television, radar or any appliance that includes a transducer designed to transmit and/or receive radio, television, telephone and/or radar signals.

11. An augmented reality communication system comprising:
   the communication device of claim 9 or claim 10; and
   an image capturing device configured to capture an image and to transmit the image to the communication device in real time, on demand or periodically.

12. A method in a device, wherein the device comprises a touch sensitive display, the method comprising:
   receiving image data from augmented reality glasses in real time, on demand or periodically; and
   displaying the image data as a haptic image on the touch sensitive display, whereby objects comprised in the haptic image are discernable to a user by sense of touch;
   receiving input data from the touch sensitive display, whereby the input data is associated with touched objects in the displayed haptic image; and
   displaying a marker associated with the received input data on the touch sensitive display or on a second display, wherein the marker is superimposed on the haptic image.

13. The method according to claim 12, wherein the image data is displayed as a haptic image on the touch sensitive display continuously, periodically, on demand or when a user touches the touch sensitive display.

* * * * *